US012231647B2

(12) United States Patent
Li et al.

(10) Patent No.: US 12,231,647 B2
(45) Date of Patent: Feb. 18, 2025

(54) SCENE TRANSITION DETECTION BASED ENCODING METHODS FOR BCW

(71) Applicant: Tencent America LLC, Palo Alto, CA (US)

(72) Inventors: Guichun Li, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 95 days.

(21) Appl. No.: 17/969,648

(22) Filed: Oct. 19, 2022

(65) Prior Publication Data

US 2023/0171405 A1 Jun. 1, 2023

Related U.S. Application Data

(60) Provisional application No. 63/284,276, filed on Nov. 30, 2021.

(51) Int. Cl.
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .. H04N 19/132; H04N 19/105; H04N 19/159; H04N 19/176; H04N 19/136; H04N 19/167; H04N 19/109; H04N 19/577
See application file for complete search history.

(56) References Cited

U.S. PATENT DOCUMENTS

| | | | |
|---|---|---|---|
| 2022/0007048 A1* | 1/2022 | He | H04N 19/577 |
| 2022/0239937 A1* | 7/2022 | Park | H04N 19/157 |
| 2022/0417496 A1 | 12/2022 | Li et al. | |

OTHER PUBLICATIONS

Benjamin Bross, et al., Versatile Video Coding Editorial Refinements on Draft 10, Joint Video Experts Team (JVET) of ITU-T SG 16 WP 3 and ISO/IEC JTC 1/SC 29, 20th Meeting, by teleconference, Oct. 7-16, 2020, Document: JVET-T2001-v2, pp. 1-511.

(Continued)

*Primary Examiner* — Hesham K Abouzahra
(74) *Attorney, Agent, or Firm* — ArentFox Schiff LLP

(57) ABSTRACT

In a method, whether a subregion of a current picture includes a fading region that transitions from a first scene to a second scene is determined during a pre-analysis stage. The subregion of the current picture includes one or more coding units (CUs). Whether a bi-prediction with CU-level weight (BCW) mode is applied to the subregion of the current picture at a block level is determined based on whether the subregion of the current picture is determined to include the fading region. An inter prediction is performed on the subregion of the current picture based on whether the subregion is determined to include the fading region and whether the BCW mode is determined to be applied to the subregion of the current picture at the block level.

20 Claims, 13 Drawing Sheets

(56) References Cited

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services-coding of moving video." in General Secretariat and Telecom Radiocommunication (ITU-R) Standardization (ITU-T), sec. H 265 (2016)., pp. 1-664.

International Search Report and Written Opinion in PCT/US2022/078718, mailed Mar. 27, 2023, 14 pages.

Choi et al. "Attention-based Bi-Prediction Network with Knowledge Distillation for Versatile Video Coding (WC)." (2022). Aug. 30, 2022, pp. 1-19.

* cited by examiner

SCENE TRANSITION DETECTION BASED ENCODING METHODS FOR BCW

INCORPORATION BY REFERENCE

The present application claims the benefit of priority to U.S. Provisional Application No. 63/284,276, "Scene Transition Detection Based Encoding Methods for BCW" filed on Nov. 30, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to an aspect of the disclosure, a method of video encoding performed in a video encoder is provided. In the method, whether a subregion of a current picture includes a fading region that transitions from a first scene to a second scene can be determined during a pre-analysis stage. The subregion of the current picture can include one or more coding units (CUs). Whether a bi-prediction with CU-level weight (BCW) mode is applied to the subregion of the current picture at a block level can be determined based on whether the subregion of the current picture is determined to include the fading region. An inter prediction can be performed on the subregion of the current picture based on whether the subregion is determined to include the fading region and whether the BCW mode is determined to be applied to the subregion of the current picture at the block level.

In some embodiments, the subregion of the current picture can be one of a coding tree unit of the current picture, a block with a predefined size, or a block with a size predefined by another detector that is different from a detector configured to detect the fading region.

In an example, the subregion of the current block can be a predefined size that includes 16 by 16 luma samples.

In some embodiments, the BCW mode can be applied to the subregion of the current picture based on the subregion being determined to include the fading region. Accordingly, the inter bi-prediction can be performed on the subregion to generate a predicted sample value of the subregion of the current picture based on the BCW mode. The predicted sample value can be equal to a weighted combination of a first predicted sample value from a first reference picture of the current picture and a second predicted sample value from a second reference picture of the current picture.

When the BCW mode is not applied to the subregion of the current picture based on the subregion not including the fading region, the inter bi-prediction can be performed on the subregion to generate a predicted sample value of the subregion of the current picture based on an equal weighting mode. The predicted sample value can be equal to an equally weighted combination of a first predicted sample value from a first reference picture of the current picture and a second predicted sample value from a second reference picture of the current picture.

When the BCW mode is applied to the subregion of the current picture based on the subregion being determined to include the fading region and an inter bi-prediction mode being applied to the subregion, the inter bi-prediction can be performed on the subregion according to the inter bi-prediction mode to generate a predicted sample value of the subregion of the current picture based on the BCW mode. The predicted sample value can be equal to a weighted combination of a first predicted sample value from a first reference picture of the current picture and a second predicted sample value from a second reference picture of the current picture.

According to another aspect of the disclosure, a method of video encoding performed in a video encoder can be provided. In the method, a plurality of predicted sample values of a current block in a down-sampled current picture can be determined during a pre-analysis stage based on a plurality of bi-prediction with coding unit level weight (BCW) modes. The down-sampled current picture can be down sampled from a current picture. Each of the plurality of predicted sample values can be equal to a respective weighed combination of a first predicted sample value from a first down-sampled reference picture that is down sampled from a first reference picture of the current picture and a second predicted sample value from a second down-sampled reference picture that is down sampled from a second reference picture of the current picture according to a respective BCW mode of the plurality of BCW modes. A plurality of cost values associated with the plurality of BCW modes can be determined. Each of the plurality of cost values can be associated with a respective difference between a sample value of the current block in the down-sampled current picture and a respective predicted sample value of the plurality of predicted sample values. A BCW mode can be determined from the plurality of BCW modes that corresponds to a minimum cost value of the plurality of cost values. A prediction of the current block can be generated based on the determined BCW mode.

In some embodiments, each of the plurality of cost values can be associated with a sum of absolute difference (SAD) between the sample value of the current block in the down-sampled current picture and the respective predicted sample value of the plurality of predicted sample values.

In some embodiments, each of the plurality of cost values can be associated with a sum of absolute transformed difference (SATD) between the sample value of the current block in the down-sampled current picture and the respective predicted sample value of the plurality of predicted sample values.

In an example, the SATD can be calculated based on a Hadamard Transform.

To generate the prediction of the current block, a first prediction of the current block can be generated based on the determined BCW mode. The first prediction of the current block can be equal to a weighed combination of a prediction from the first reference picture of the current picture and a prediction from the second reference picture of the current picture according to the determined BCW mode. A second prediction of the current block can be generated based on an equal weighting mode. The second prediction of the current block can be equal to an equally weighed combination of the prediction from the first reference picture of the current picture and the prediction from the second reference picture of the current picture according to the equal weighting mode. Which one of the first prediction and the second prediction is applied to predict the current block can be determined based on a comparison between (i) a first rate distortion value that is associated with a first difference between the current block and the first prediction of the current block, and (ii) a second rate distortion value that is associated with a second difference between the current block and the second prediction of the current block.

In some embodiments, the first rate distortion value and the second rate distortion value can be calculated in parallel.

In some embodiments, the first rate distortion value and the second rate distortion value can be calculated based on (i) a same cost function and (ii) one of a multithreaded program or a processor with multiple processing units.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
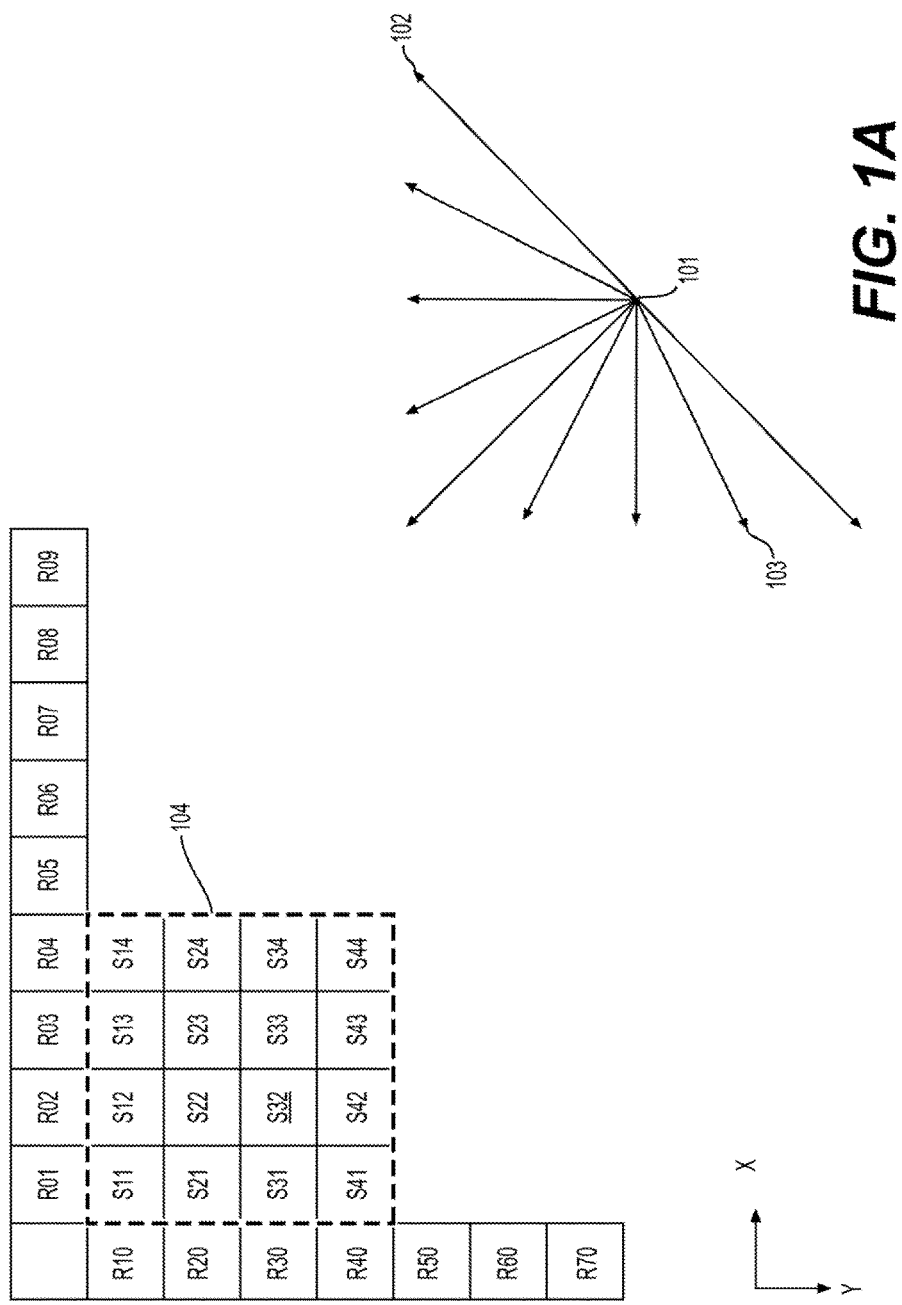
FIG. 1A is a schematic illustration of an exemplary subset of intra prediction modes.
Figure 1B:
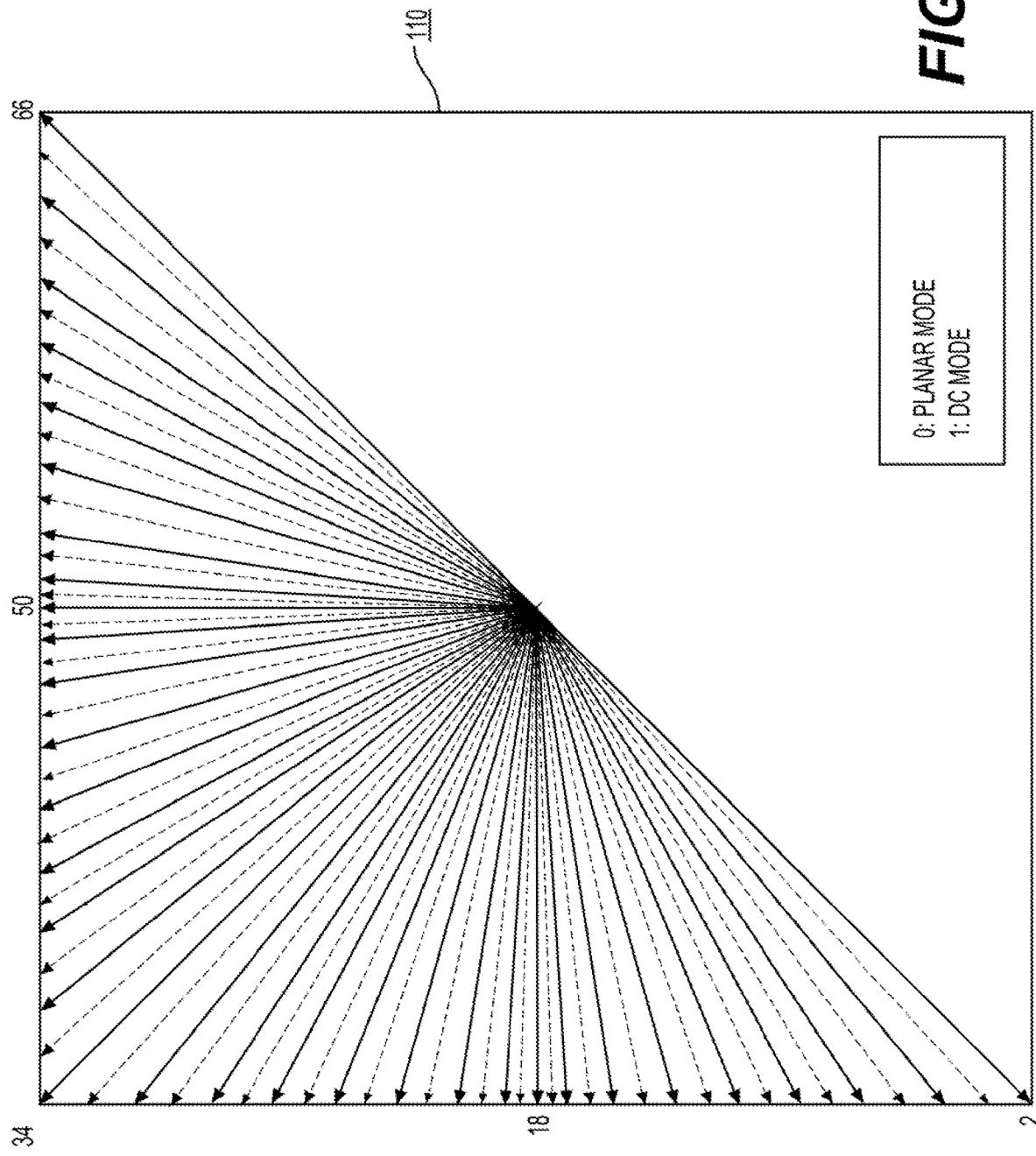
FIG. 1B is an illustration of exemplary intra prediction directions.
Figure 2:
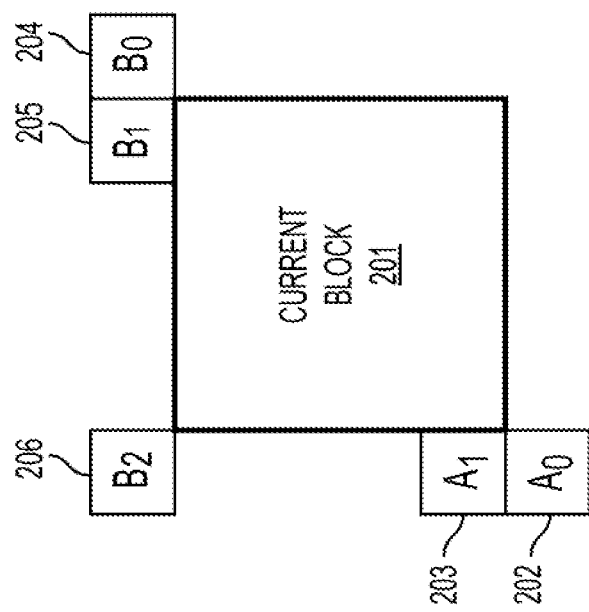
FIG. 2 is a schematic illustration of a current block and its surrounding spatial merge candidates in one example.
Figure 3:
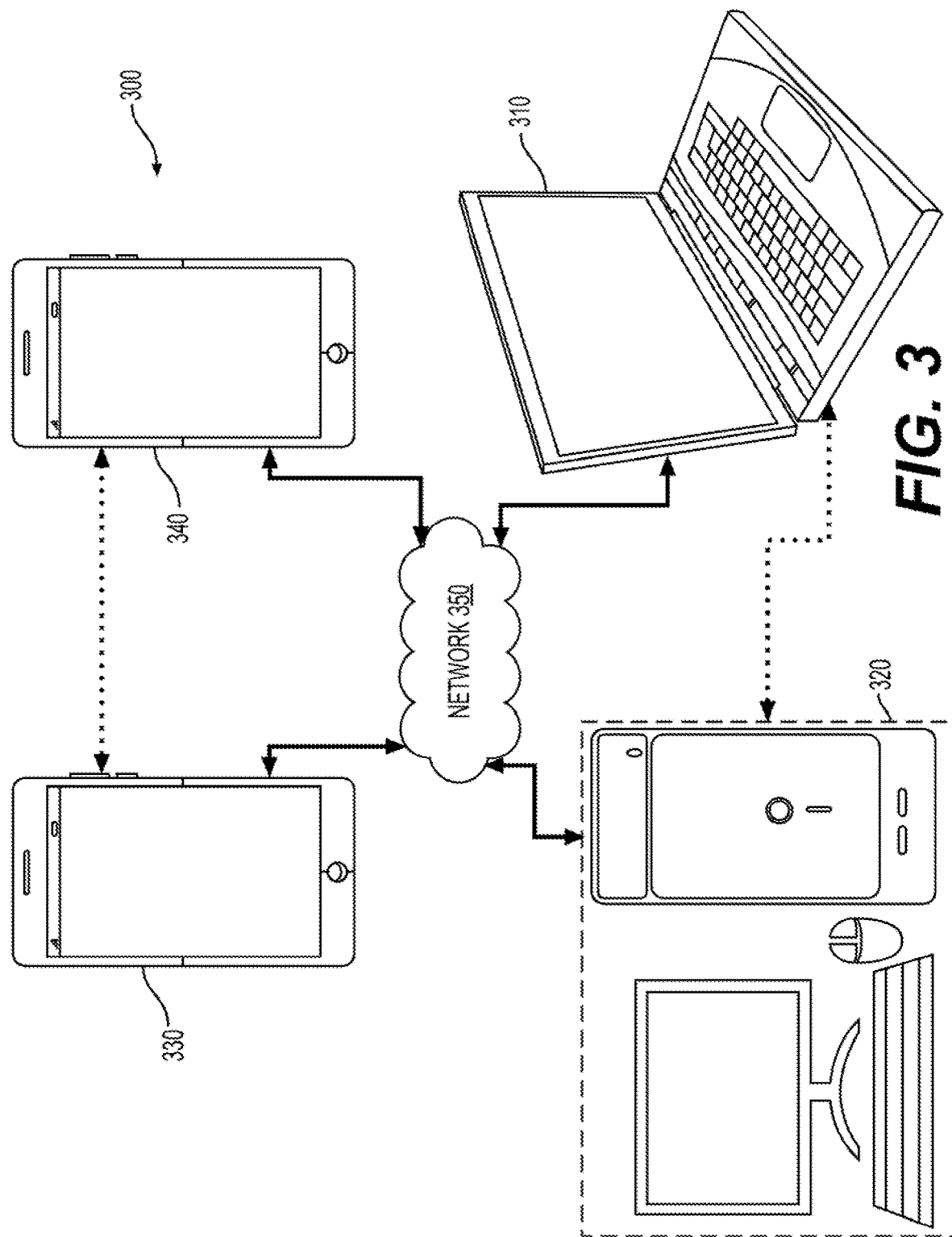
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
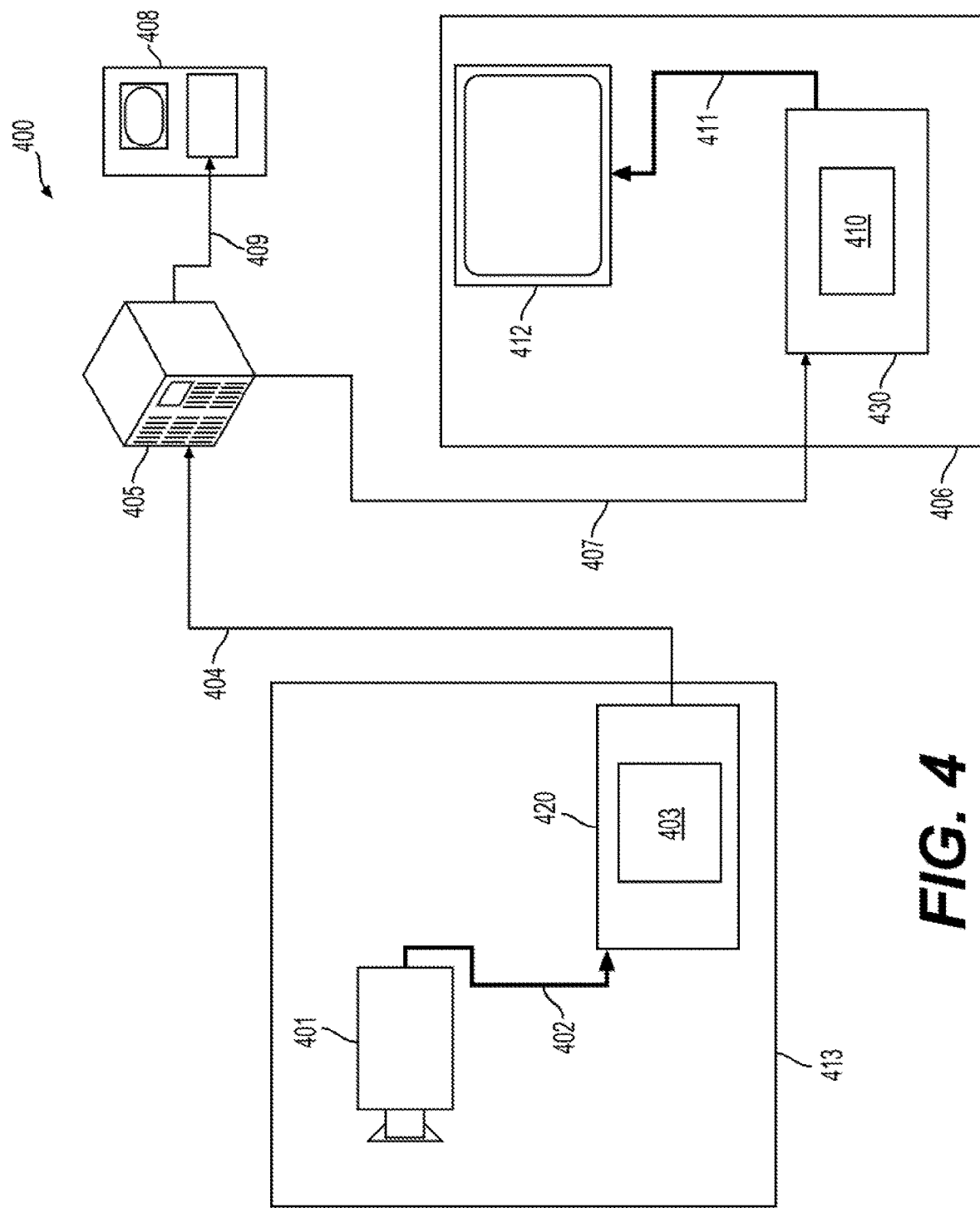
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
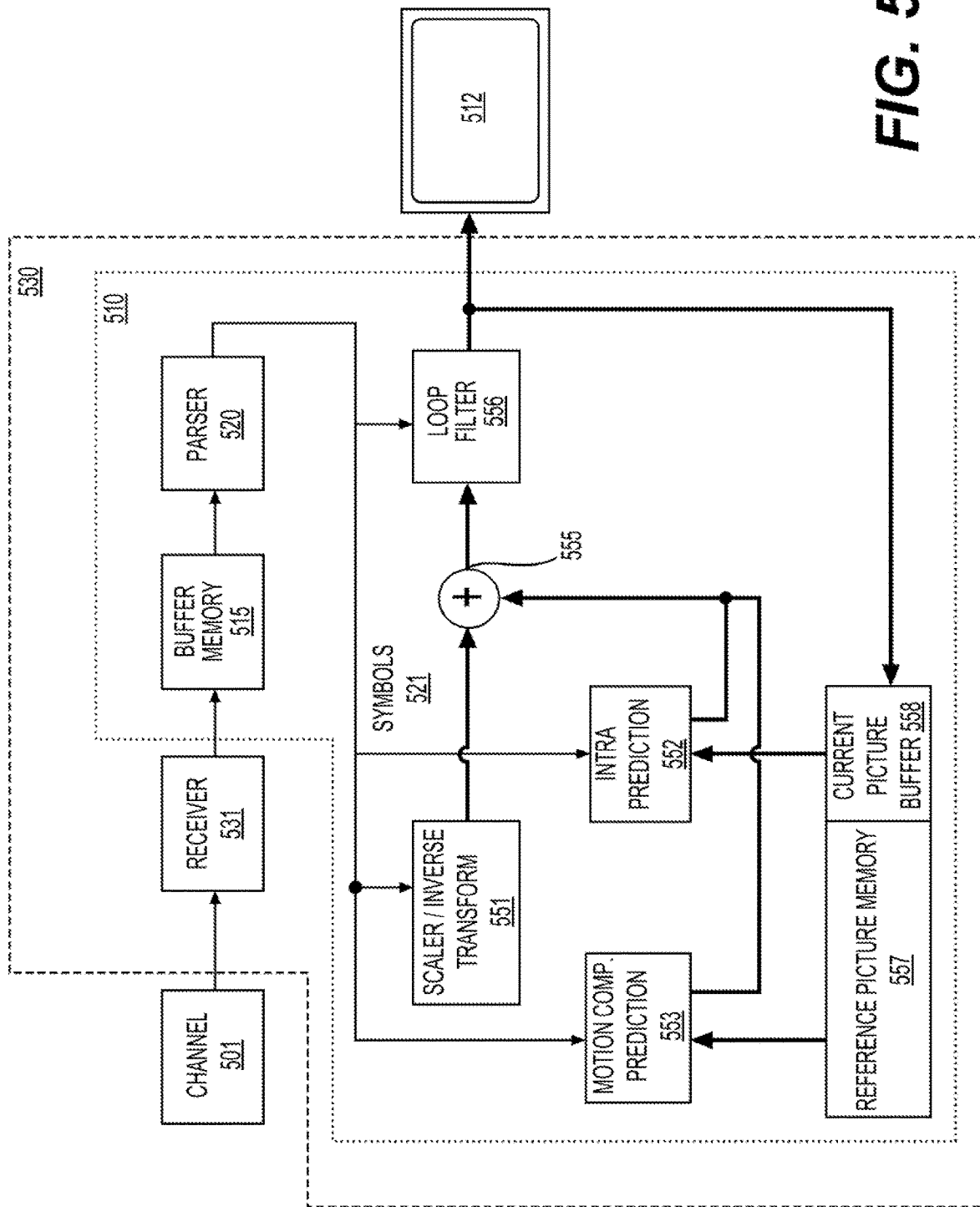
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
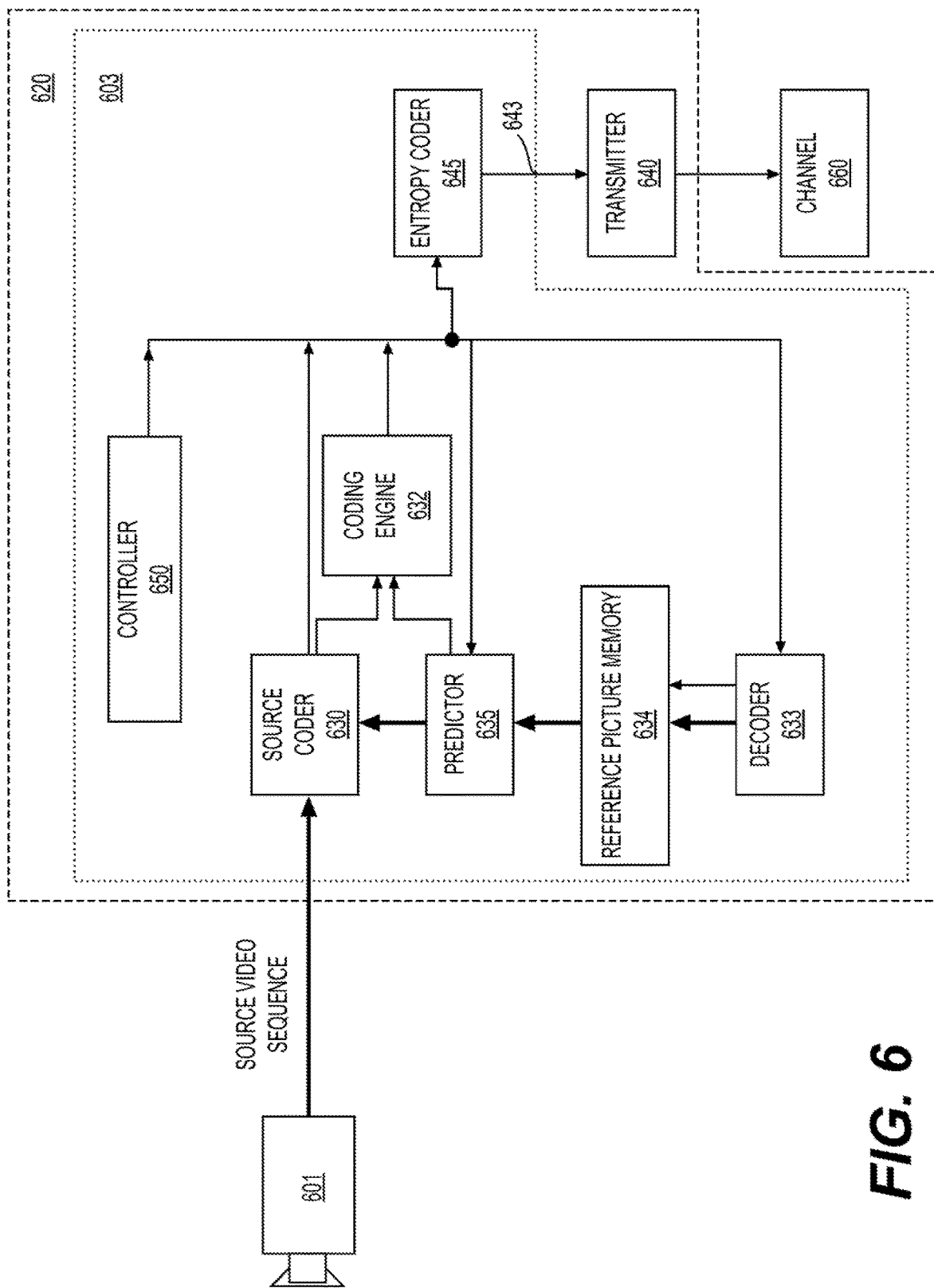
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB) and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
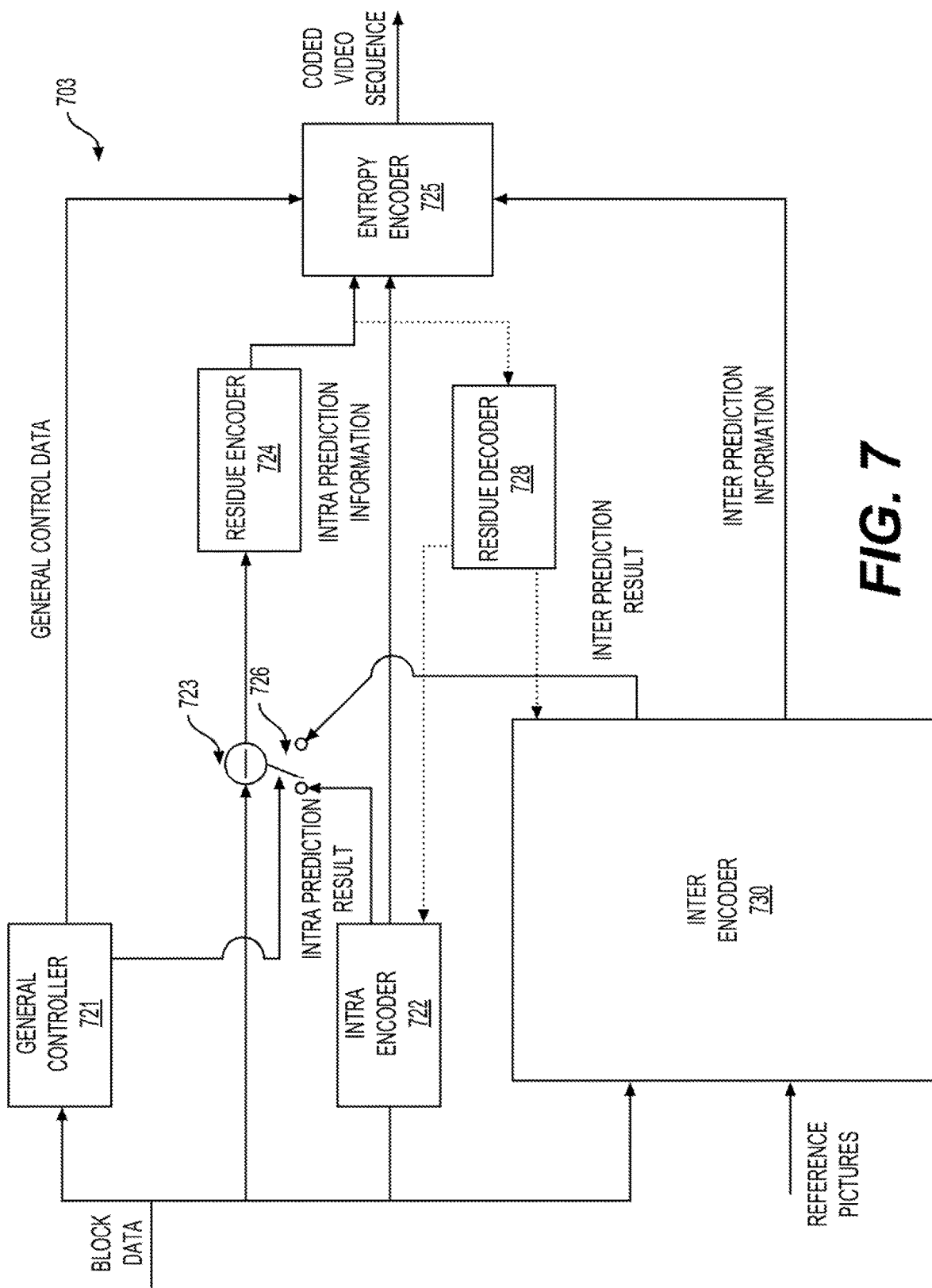
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
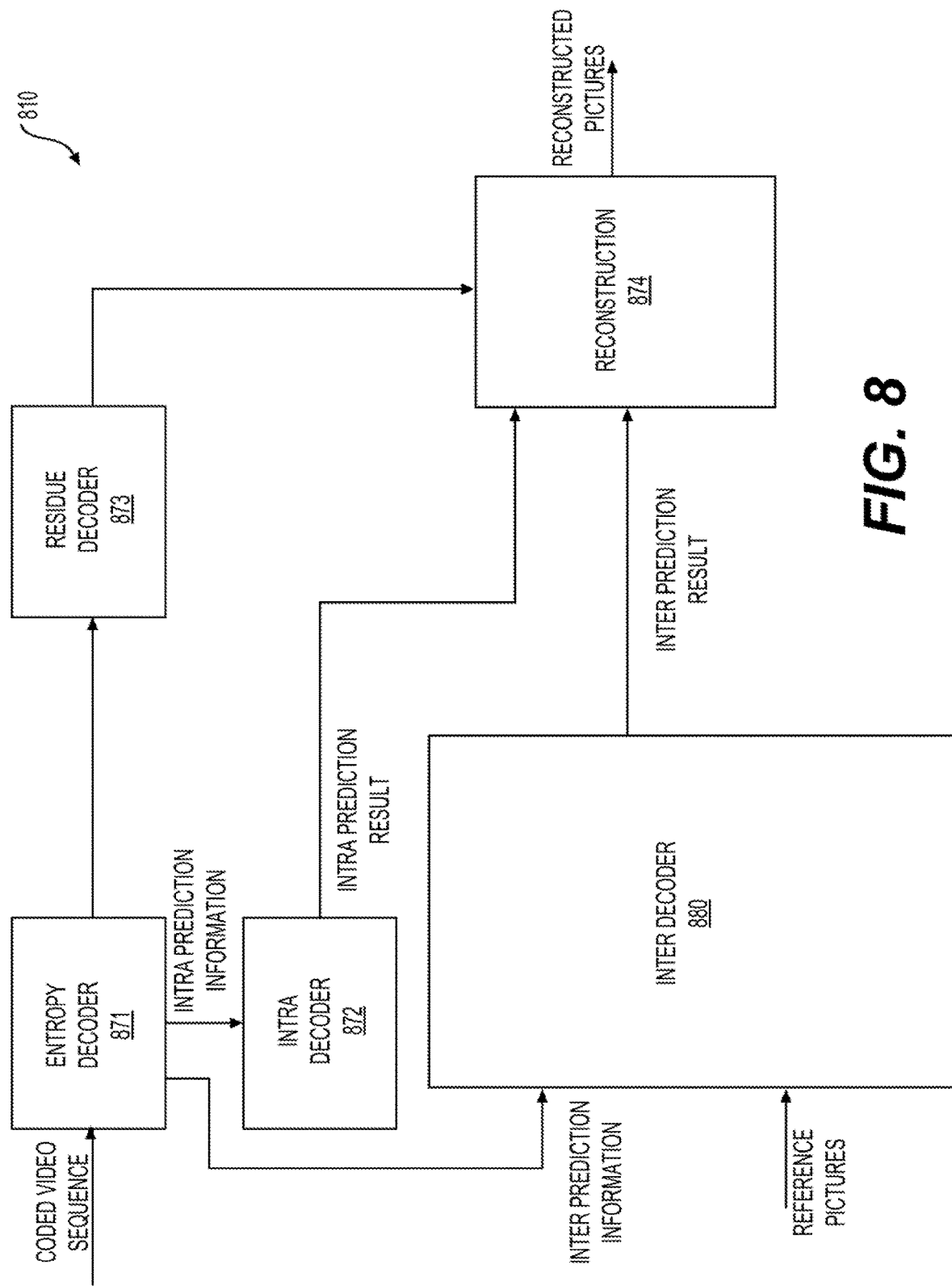
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to scene detection-based encoding fast methods. The embodiments include methods for preprocessing and/or encoding optimizations, such as for an inter bi-prediction. The inter bi-prediction can be performed with a CU-level weight (BCW) mode selection by utilizing a gradual scene transition detection of pictures or regions of pictures.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed JVET (Joint Video Exploration Team) to explore the potential of developing a next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/ 10th JVET meeting. As a result of the meeting, JVET formally launched a standardization process of next-generation video coding beyond HEVC. The new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:
(1) Extended merge prediction
(2) Merge motion vector difference (MMVD)
(3) Advanced Motion Vector Prediction (AMVP) mode with symmetric MVD signalling
(4) Affine motion compensated prediction
(5) Subblock-based temporal motion vector prediction (SbTMVP)
(6) Adaptive motion vector resolution (AMVR)

(7) Motion field storage: $\frac{1}{16}^{th}$ luma sample MV storage and 8×8 motion field compression
(8) Bi-prediction with CU-level weights (BCW)
(9) Bi-directional optical flow (BDOF)
(10) Decoder-side motion vector refinement (DMVR)
(11) Combined inter and intra prediction (CIIP)
(12) Geometric partitioning mode (GPM)

In BCW, a bi-prediction signal, such as in HEVC, can be generated by averaging two prediction signals obtained from two different reference pictures and/or using two different motion vectors. In VVC, the bi-prediction mode can be extended beyond simple averaging to allow weighted averaging of the two prediction signals. In an example, the weighted averaging of the two prediction signals can be shown in equation (1)

$$P_{bi\text{-}pred}=((8-w)*P_0+w*P_1+4)>>3 \qquad \text{Eq. (1)}$$

where w can be a weight, $P_0$ can be a first predictor, and $P_1$ can be a second predictor, respectively. A number of weights, such as five weights, may be allowed in the weighted averaging bi-prediction, for example $w \in \{-2, 3, 4, 5, 10\}$. For each bi-predicted CU, the weight w can be determined in one of two ways: (1) for a non-merge CU, a weight index can be signalled after the motion vector difference, or (2) for a merge CU, the weight index can be inferred from neighboring blocks based on a merge candidate index. In an example, BCW is only be applied to CUs with 256 or more luma samples (e.g., CU width times CU height is greater than or equal to 256). For low-delay pictures, all 5 weights can be used. For non-low-delay pictures, a smaller number weights, such as only 3 weights (e.g., $w \in \{3,4,5\}$), can be used.

At an encoder, fast search algorithms can be applied to find the weight index without significantly increasing the encoder complexity. Exemplary fast search algorithms can be summarized as follows.
(1) when combined with AMVR, unequal weights may only be conditionally checked for 1-pel and 4-pel motion vector precisions if the current picture is a low-delay picture.
(2) when combined with affine, affine ME will be performed for unequal weights if and only if the affine mode is selected as the current best mode.
(3) when two reference pictures in bi-prediction are the same, unequal weights may only be conditionally checked.
(4) unequal weights may not be searched when certain conditions are met, depending on the POC distance between the current picture and reference pictures of the current picture, a coding quantization parameter (QP), and a temporal level.

The BCW weight index can be coded using one context coded bin followed by bypass coded bins. A first context coded bin can indicate if an equal weight is used. If an unequal weight is used, additional bins can be signalled using bypass coding to indicate which unequal weight is used.

Weighted prediction (WP), which can be processed in a picture level, can be a coding tool supported by video standards, such as the H.264/AVC and HEVC standards, to efficiently code video content with fading. Support for WP can also be added into the VVC standard. WP can allow weighting parameters (e.g., a weight and an offset) to be signalled for each reference picture in each of reference picture lists L0 and L1. Then, during motion compensation, the weight(s) and offset(s) of corresponding reference picture(s) can be applied. WP and BCW can be designed for different types of video content. In order to avoid interactions between WP and BCW, which can complicate VVC decoder design, if a CU uses WP, then the BCW weight index may not be signalled, and w can be inferred to be 4 (e.g., an equal weight is applied). For a merge CU, the weight index can be inferred from neighboring blocks based on a merge candidate index. The merge CU can be obtained based on one of a normal merge mode and an inherited affine merge mode. For a constructed affine merge mode, affine motion information can be constructed based on motion information of up to 3 blocks. The BCW index for a CU using the constructed affine merge mode can simply be set equal to the BCW index of a first control point MV.

In some examples, CIIP and BCW, such as in VVC, may not be jointly applied for a CU. When a CU is coded with CIIP mode, the BCW index of the current CU can be set to 2, e.g., an equal weight.

Motion Compensated Temporal Filtering (MCTF) may be used as a preprocessing tool in various encoders. For example, VTM (VVC reference software) can use a temporal filter (TF) to increase similarity between a current frame and neighbor frames of the current fame so that residual information can be reduced. The term TF frame can be used to denote a frame to be filtered by the temporal filter. TF can be applied for each picture at an interval POC of 16 or 8. Up to 4 references in a forward and a backward direction can be used to derive a weight for bilateral filtering. Original samples of TF frames at a kth spatial location can be filtered as described in equation (2)

$$I_n(k) = \frac{I_o(k) + \sum_{i=0}^{7} w_r(i, a, k) I_r(i, k)}{1 + \sum_{i=0}^{7} w_r(i, a, k)} \qquad \text{Eq. (2)}$$

where, $I_n$ (k) and $I_o$ (k) can represent a filtered pixel (or filtered pixel value) and an original pixel (or original pixel value) of a pixel i in a current picture at a spatial location k, respectively. k can be the location of the pixel i in the current picture. $I_r$(i, k) can denote a collocated pixel (or collocated pixel value) in a neighboring picture $I_r$ for the pixel i in the current picture. The collocated pixel can also be located at a kth spatial location of the neighboring picture $I_r$ which is at a rth motion compensated reference frame. The neighboring picture $I_r$ can be derived by performing motion estimation and then motion compensation from the reference frame r to the current TF picture. A weight for each reference (or pixel) i in α number of available reference pictures at the spatial location k, $w_r$(i, α, k), can be derived as follows in equation (3) for a luma sample:

$$w_r(i, a, k) = bw \cdot s_o \cdot s_r(i, a) \cdot e^{-\frac{\Delta I(i,k)^2}{sw \cdot \sigma_i(QP)^2}} \qquad \text{Eq. (3)}$$

where, bw=0.4 stands for a base weight, $s_0$ is a basic filter strength decided by an interval POC as described in equation (4)

$$s_0 = \begin{cases} 1.50 & \text{if } POC\%16 = 0 \\ 0.95 & \text{if } POC\%8 = 0 \end{cases} \qquad \text{Eq. (4)}$$

A reference filter strength, $s_r$(i, α), can be defined by a look up table depending on whether references are available in both directions (α=8 references) or one direction (α=4 references). $s_r$(i, α) can be described in equation (5) as follows:

$$s_r(i, 4) = \begin{cases} 1.13 \\ 0.97 \\ 0.81 \\ 0.57 \end{cases}, \text{ and} \qquad \text{Eq. (5)}$$

$$s_r(i, 8) = \begin{cases} 0.33 \\ 0.41 \\ 0.57 \\ 0.85 \\ 0.85 \\ 0.57 \\ 0.41 \\ 0.33 \end{cases}$$

$\Delta I(i, k)$ can represent a pixel difference between the original pixel at the spatial location k and the collocated pixels of the original pixel if the original pixel is at a ith reference picture. sw can denote a sigma base weight of 2. $\sigma_i(QP)=3*(QP-10)$ when QP is a slice QP. The base weight bw and the sigma weight sw can further be adjusted adaptively for each 8×8 block based on a block error and a simple block frequency weighting.

Scene cut detection may include a technique for detecting whether an abrupt scene transition occurs, for example when content changes from one scene to another scene. A scene change can result in a significant change in content, and can be detected for example by evaluating a difference between temporally neighboring pictures.

Flash detection may include a technique for detecting whether one or more pictures are significantly different from other pictures in a sequence of pictures of one scene, such as due to a camera flash, or insertion of picture(s), such as during video editing. The flash detection can be performed in a similar way as scene cut detection, for example. Flash detection may be performed to determine whether past and future neighboring frames belong to a same scene.

Fade detection can include a technique to detect whether a group of consecutive pictures are in the middle of a gradual transition from one scene to another. Some special cases may include transitioning into or out of a blank picture with one color, such as black or white. A histogram of pictures can be utilized to perform the fade detection.

Noise estimation is a common technique that can be used in image processing for example. A noise level can often be estimated by evaluating a gradient energy of a picture. Local contents like edges, smooth areas, or textures can be further utilized to derive the noise level with a higher accuracy.

Figure 9:
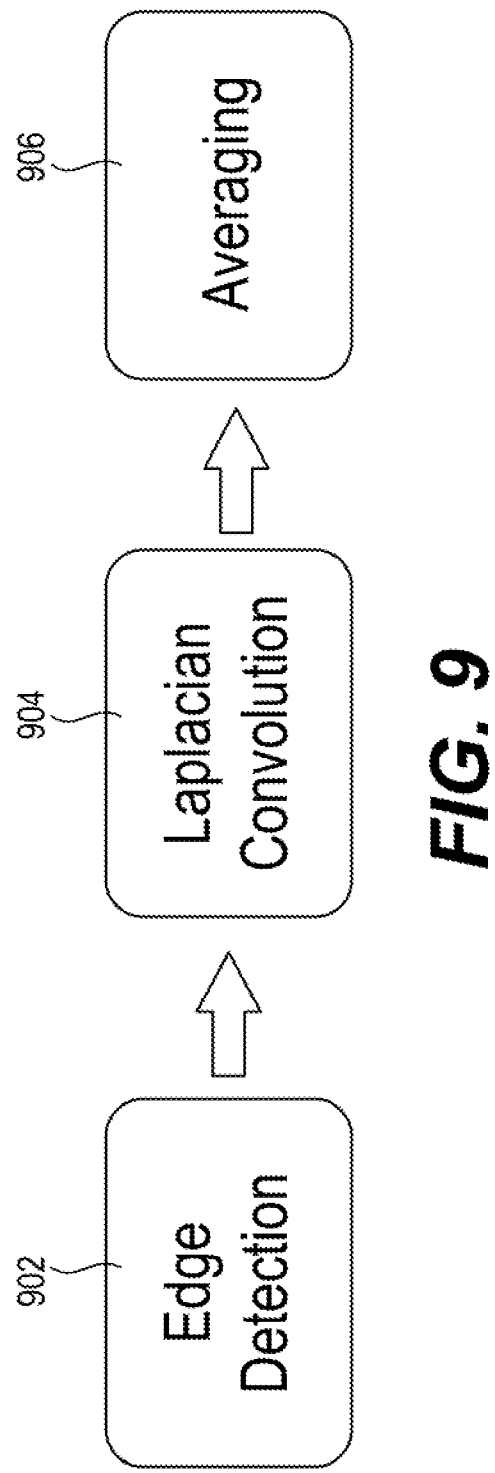
FIG. 9 shows a schematic illustration of an exemplary noise detection process according to some embodiments of the disclosure.

In an example, a noise detection process can be shown in FIG. 9. As shown in FIG. 9, at (902), edge detection may be performed. For example, a Sobel operation can be used for edge detection to exclude edges from noise detection.

According to the Sobel operation, a current picture can be denoted as I(x, y), where (x, y) is a coordinate of a pixel. An output of the Sobel operator can be described in equation (6) as follows:

$$G = \left| I(x, y) * \begin{bmatrix} -1 & -2 & -1 \\ 0 & 0 & 0 \\ 1 & 2 & 1 \end{bmatrix} \right| + \left| I(x, y) * \begin{bmatrix} -1 & 0 & 1 \\ -2 & 0 & 2 \\ -1 & 0 & 1 \end{bmatrix} \right| \qquad \text{Eq. (6)}$$

where |•| defines an absolute operator. An edge map can be determined using a threshold $G_{th}$ for G. At (904), Laplacian convolution can be performed. For example, pixels with $G<G_{th}$ can be used in the noise detection with a Laplacian operator. At (906), averaging can be performed. For example, a noise level calculation can be described in equation (7).

$$\sigma = \sqrt{\frac{\pi}{2}} \frac{1}{6(W-2)(H-2)} \sum_{x,y} |I(x, y) * N| \qquad \text{Eq. (7)}$$

where N can be a Laplacian operator according to equation (8).

$$N = \begin{bmatrix} 1 & -2 & 1 \\ -2 & 4 & -2 \\ 1 & -2 & 1 \end{bmatrix} \qquad \text{Eq. (8)}$$

Simple content, such as a blank screen, can be detected for a block with B×B pixels by comparing a pixel variance and/or a pixel value range (e.g., max_pixel_val−min_pixel_val).

To reduce computational complexity, down-sampled pictures can be used for pre-analysis of a video sequence in video encoders. In an example, a pre-analysis picture can be down sampled with a 1:2 ratio both vertically and horizontally from an original full-sized picture, which can result in a down-sampled pre-analysis picture with ¼ of the number of pixels as in the original picture.

In some cases, the down-sampled pictures can be stored along with the original picture, for example until the original picture is no longer needed in the encoding process.

Scene transition detection can be used to optimize encoding performance, such as by assisting rate control and/or coding tool adjustment. Scene transition detection may also be used to improve encoding speed. In an example, fade detection can typically be performed at a picture level, which may not work efficiently when only a part of a picture has a gradual scene transition. In order to benefit one or more special coding tools, such as BCW in VVC, it may be beneficial, and in some cases necessary, to apply fade detection in smaller regions. In an example, a BCW mode decision is typically performed by accessing each candidate BCW mode in a full rate-distortion (RD) optimization search on an encoder side. The full RD optimization search may require multiple rounds and/or large amounts of iterative computation at a full resolution, which can slow down the encoding process significantly. Pre-analysis statistic data and down-sampled pre-analysis pictures can be utilized to improve the encoding speed.

In the disclosure, scene transition detection, such as a gradual scene transition detection, may be performed at a block level. In some embodiments, a combination of the scene transition detection and a fast BCW decision can be provided, such as in an encoder side. For example, gradual scene transition can include fade/fading and can be referred as fade detection. Based on the fade detection, whether a current picture or a subregion of a current picture includes a fading region that transitions from a first scene to a second scene can be determined.

Fade detection at a block level can be applied in a pre-analysis stage of an encoder. The pre-analysis stage can include one or more preprocessing processes (e.g., Motion Compensated Temporal Filtering or down sampling) that are applied to a current block or a current picture to generate pre-analysis information. To improve coding efficiency and reduce computational complexity, the pre-analysis information can further be applied when the current block or the current picture is encoded by the encoder to generate prediction information of the current block or the current picture. In an example, in the pre-analysis state of the encoder, whether a subregion of a current picture is a fading region can be determined based on the fade detection at the block level. A result of the fading detection can be applied in an encoding process of the encoder to generate prediction information of the current picture.

In an embodiment, the fade detection can be performed on one or more regions that are smaller than a picture. For example, the one or more regions can be subregions of a current picture. Further, a detection result of the fade detection may be used to assist in making a block level BCW mode decision. For example, a BCW mode of a plurality of candidate BCW modes can be selected based on the result of the fade detection.

In an embodiment, fade detection can be performed at different levels, such as a coding-tree unit (CTU) level. For example, the fade detection can be applied to a subregion of a current picture, where the subregion can include one or more CTUs.

In an embodiment, fade detection can be performed for a predefined block size (e.g., N×M luma samples) level. In an example, the predefined size can be 16×16 luma samples. In an example, the fade detection can be applied to a subregion of a current picture, where the subregion can include one or more blocks with the predefined size.

In an embodiment, fade detection can be performed for a block size that is equal to a block size that is predefined by another detector for video processing. For example, the other detector may be a screen content detector. The other detector can be different from a detector configured to perform the fade detection.

In the disclosure, a fast BCW mode decision can be provided based on results of a block level fade detection. The block level fade detection can determine whether a subregion of a current picture is a fading region. Based on whether the subregion is a fading region, a BCW mode for the subregion can be determined quickly and efficiently from a plurality of candidate BCW modes and an equal weighting mode.

In an embodiment, the BCW mode selection for a coding unit in a current picture can be performed when the coding unit is in a region which is determined to be a fading region. Otherwise, the BCW mode selection may not be performed. A default 1:1 weighting (or equal weighing) can be used for an inter bi-prediction. Accordingly, a predicted sample value of the coding unit can be determined as an equally weighted combination of a first predicted sample value from a first reference picture of the current picture and a second predicted sample value from a second reference picture of the current picture.

In an embodiment, the BCW mode selection for a coding unit can be performed when a best mode for the coding unit is an inter bi-prediction mode, and the coding unit is in a region which is determined to be a fading region. In an example. The BCW mode selection is performed only when these two conditions are met. Accordingly, a BCW mode for the coding unit can be determined from a plurality of candidate BCW modes and an equal weighting mode.

In the disclosure, the fast BCW mode decision can be performed based on down-sampled pictures. Down-sampled pre-analysis pictures can be applied to make lower complexity BCW mode decisions. In an example, a down-sampled pre-analysis picture can refer to a picture which is down sampled from a corresponding original input picture. The down-sampled pre-analysis picture can be used in a pre-analysis stage of an encoder. In an example of an inter bi-prediction, the down-sampled pictures can include a down-sampled current picture that is down sampled from a current picture, a first down-sampled reference picture that is down sampled from a first reference picture of the current picture and a second down-sampled reference picture that is down sampled from a second reference picture of the current picture.

In an embodiment, a BCW mode can be estimated by using down-sampled pre-analysis pictures. The down-sampled pre-analysis pictures can include a down-sampled current picture and one or more down-sampled reference pictures.

In an embodiment, for a pre-analysis inter prediction cost estimation, when a best mode (or selected mode) for a current pre-analysis block is an inter bi-prediction mode, a cost of each of a plurality of BCW modes (or candidate BCW modes) can be calculated using reference blocks from two down-sampled reference pictures, such as a first down-sampled reference picture in a first reference list and a second down-sampled reference picture in a second reference list. When a cost of a BCW mode meets certain criteria or a threshold value (e.g., the BCW mode has a minimum cost value), the BCW mode can be stored for the current pre-analysis block.

In an example, based on the plurality of BCW modes, a plurality of predicted sample values of the current block (or current pre-analysis block) in a down-sampled current picture that is down sampled from a current picture can be determined. Each of the plurality of predicted sample values can be equal to a respective weighed combination of a first predicted sample value from the first down-sampled reference picture that is down sampled from a first reference picture of the current picture and a second predicted sample value from the second down-sampled reference picture that is down sampled from a second reference picture of the current picture according to a respective BCW mode of the plurality of BCW modes. According to the cost estimation, a plurality of cost values associated with the plurality of BCW modes can be determined. Each of the plurality of cost values can be associated with a respective difference between a sample value of the current block (or the current pre-analysis block) in the down-sampled current picture and a respective predicted sample value of the plurality of predicted sample values. A BCW mode can be determined from the plurality of BCW modes that corresponds to a minimum cost value of the plurality of cost values.

During an encoding process, if a coding block is a pre-analysis block that corresponds to a stored BCW mode, a full rate distortion (RD) search can be performed based on the stored BCW mode for the coding block. The stored BCW mode can be determined in a pre-analysis stage for the pre-analysis block. In an example, the stored BCW mode can be a BCW mode that is selected in the pre-analysis inter prediction cost estimation from a plurality of candidate BCW modes in the pre-analysis stage. In an example, only the stored BCW mode that is selected from the plurality of candidate BCW modes is applied in the full RD search. Other candidate BCW modes of the plurality of candidate BCW modes can be excluded in the full RD search. In the full RD search, rate distortion values of the stored BCW mode and an equal weighing mode can be calculated. One of the stored BCW mode and the equal weighting mode can be selected based on which one of the stored BCW mode and the equal weighing mode has a smaller rate distortion value.

The BCW cost estimation can be performed using various cost functions. In an embodiment, a cost function used in the BCW cost estimation of the pre-analysis stage can be Sum of Absolute Difference (SAD). In an embodiment, the cost function used in the BCW cost estimation of the pre-analysis stage can be Sum of Absolute Transformed Difference (SATD). In an embodiment, a transform method used in the BCW cost estimation can be a Hadamard Transform. For example, the Hadamard Transform can be applied in the SATD.

In an embodiment, to improve a processing speed, the BCW cost calculation can be operated in parallel, for example with a regular equal weighting bi-prediction cost calculation. In an embodiment, the BCW cost calculation and the equal weighting bi-prediction cost calculation can use a same cost function, such as the SAD and the SATD. In an embodiment, the BCW cost calculation and the equal weighting bi-prediction cost calculation can use the same inputs of a current block and reference blocks of the current block, such as predicted sample values of the current block based on the reference blocks and initial sample values of the current block. In an embodiment, the BCW cost calculation can be operated in parallel with the regular equal weighting bi-prediction cost calculation by utilizing multi-threading in a software encoder or by utilizing multiple processing units in a hardware encoder. For example, the BCW cost calculation can be operated in parallel with the regular equal weighting bi-prediction cost calculation based on one of a multithreaded program or a processor with multiple processing units.

Figure 10:
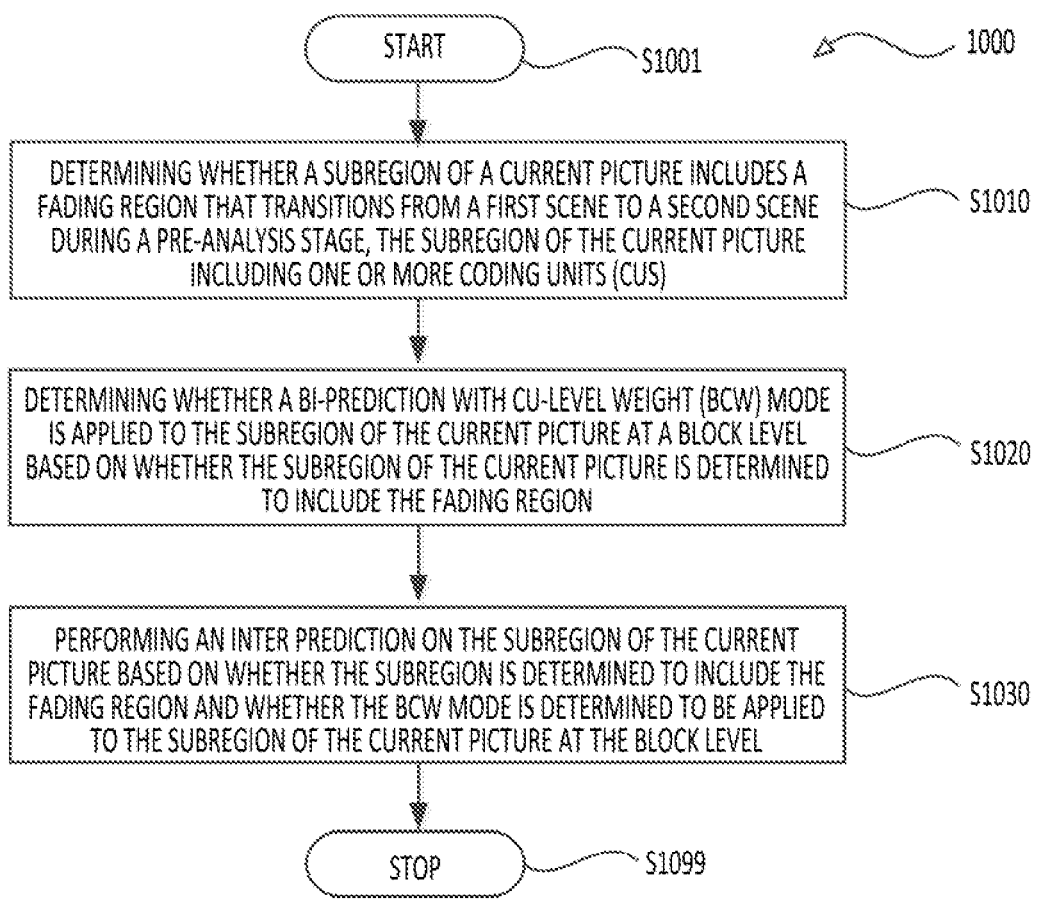
FIG. 10 shows a flow chart outlining an exemplary encoding process according to some embodiments of the disclosure.
Figure 11:
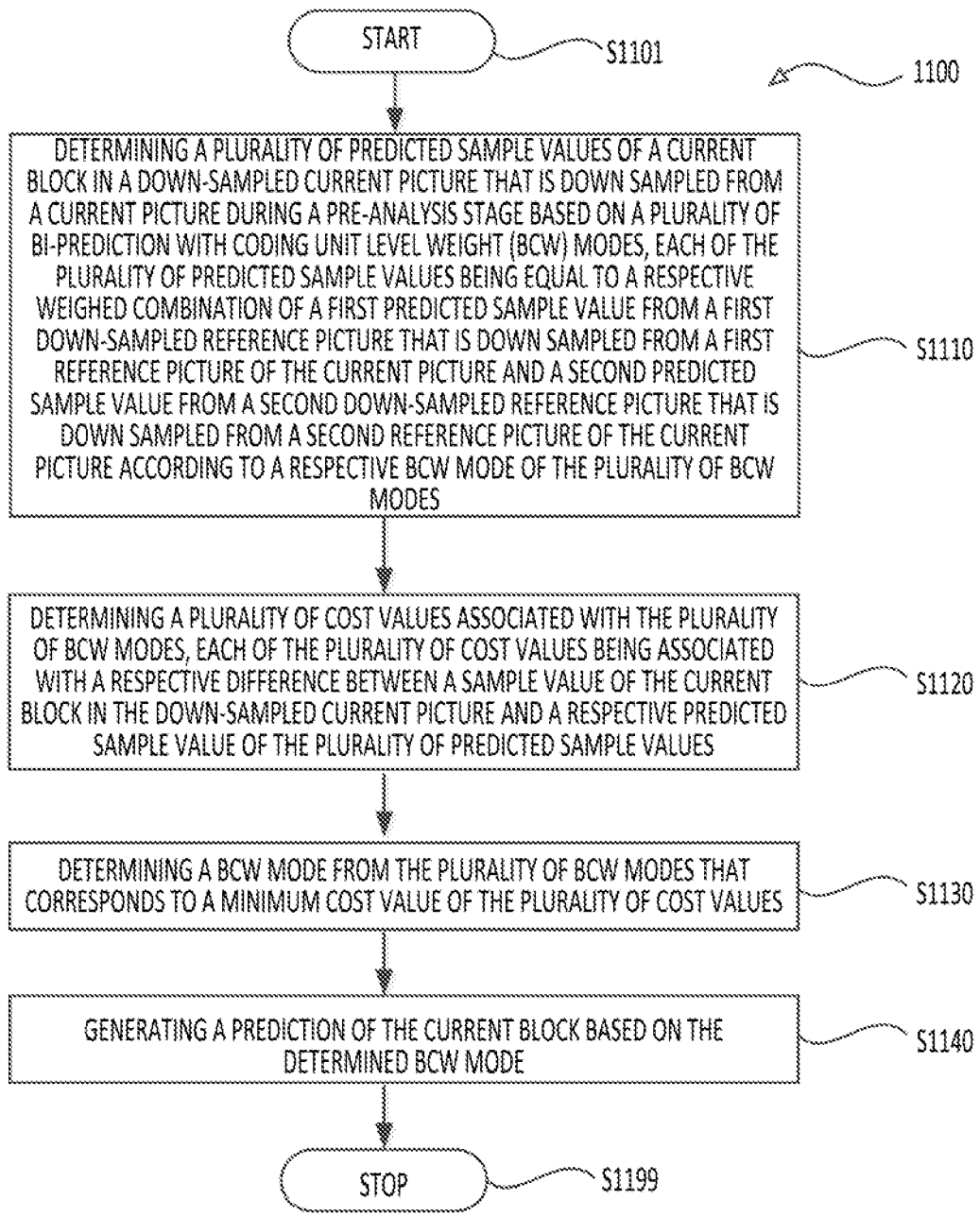
FIG. 11 shows a flow chart outlining an exemplary encoding process according to some embodiments of the disclosure.

FIG. 10 shows a flow chart outlining a first exemplary encoding process (1000) according to some embodiments of the disclosure. FIG. 11 shows a flow chart outlining a second exemplary encoding process (1100) according to some embodiments of the disclosure. The processes (or embodiments) may be implemented by processing circuitry (e.g., one or more processors or one or more integrated circuits). In one example, the one or more processors execute a program that is stored in a non-transitory computer-readable medium.

The processes (e.g., (1000) and (1100)) can be used in the encoding of a block, so as to generate a prediction block for the block. In various embodiments, the processes (e.g., (1000) and (1100)) are executed by processing circuitry, such as the processing circuitry in the terminal devices (310), (320), (330) and (340), the processing circuitry that performs functions of the video encoder (403), the processing circuitry that performs functions of the video encoder (603), and the like. In some embodiments, the processes (e.g., (1000) and (1100)) are implemented in software instructions, thus when the processing circuitry executes the software instructions, the processing circuitry performs the processes (e.g., (1000) and (1100)).

As shown in FIG. 10, the process (1000) can start from (S1001) and proceed to (S1010). At (S1010), whether a subregion of a current picture includes a fading region that transitions from a first scene to a second scene can be determined during a pre-analysis stage. The subregion of the current picture can include one or more CUs.

At (S1020), whether a BCW mode is applied to the subregion of the current picture at a block level can be determined based on whether the subregion of the current picture is determined to include the fading region.

At (S1030), an inter prediction can be performed on the subregion of the current picture based on whether the subregion is determined to include the fading region and whether the BCW mode is determined to be applied to the subregion of the current picture at the block level.

In some embodiments, the subregion of the current picture can be one of a coding tree unit of the current picture, a block with a predefined size, or a block with a size predefined by another detector that is different from a detector configured to detect the fading region.

In an example, the subregion of the current block can be a predefined size that includes 16 by 16 luma samples.

In some embodiments, the BCW mode can be applied to the subregion of the current picture based on the subregion being determined to include the fading region. Accordingly, the inter bi-prediction can be performed on the subregion to generate a predicted sample value of the subregion of the current picture based on the BCW mode. The predicted sample value can be equal to a weighted combination of a first predicted sample value from a first reference picture of the current picture and a second predicted sample value from a second reference picture of the current picture.

When the BCW mode is not applied to the subregion of the current picture based on the subregion not including the fading region, the inter bi-prediction can be performed on the subregion to generate a predicted sample value of the subregion of the current picture based on an equal weighting mode. The predicted sample value can be equal to an equally weighted combination of a first predicted sample value from a first reference picture of the current picture and a second predicted sample value from a second reference picture of the current picture.

When the BCW mode is applied to the subregion of the current picture based on the subregion being determined to include the fading region and an inter bi-prediction mode being applied to the subregion, the inter bi-prediction can be performed on the subregion according to the inter bi-prediction mode to generate a predicted sample value of the subregion of the current picture based on the BCW mode. The predicted sample value can be equal to a weighted combination of a first predicted sample value from a first reference picture of the current picture and a second predicted sample value from a second reference picture of the current picture.

After (S1030), the process proceeds to (S1099) and terminates.

The process (1000) can be suitably adapted. Step(s) in the process (1000) can be modified and/or omitted. Additional step(s) can be added. Any suitable order of implementation can be used. A decoder may be configured to perform a decoding process of reconstructing the encoded blocks. For example, the decoder can receive signal information that indicates a BCW mode applied to the decoding process. The BCW mode can be determined in the encoding process (1000). The decoder can further reconstruct the encoded blocks based on the BCW mode.

As shown in FIG. 11, the process (1100) can start from (S1101) and proceed to (S1110). At (S1110), a plurality of predicted sample values of a current block in a down-sampled current picture can be determined during a pre-analysis stage based on a plurality of BCW modes. The down-sampled current picture can be down sampled from a current picture. Each of the plurality of predicted sample values can be equal to a respective weighed combination of a first predicted sample value from a first down-sampled reference picture that is down sampled from a first reference picture of the current picture and a second predicted sample value from a second down-sampled reference picture that is down sampled from a second reference picture of the current picture according to a respective BCW mode of the plurality of BCW modes.

At (S1120), a plurality of cost values associated with the plurality of BCW modes can be determined. Each of the plurality of cost values can be associated with a respective difference between a sample value of the current block in the down-sampled current picture and a respective predicted sample value of the plurality of predicted sample values.

At (S1130), a BCW mode can be determined from the plurality of BCW modes that corresponds to a minimum cost value of the plurality of cost values.

At (S1140), a prediction of the current block can be generated based on the determined BCW mode.

In some embodiments, each of the plurality of cost values can be associated with a SAD between the sample value of the current block in the down-sampled current picture and the respective predicted sample value of the plurality of predicted sample values.

In some embodiments, each of the plurality of cost values can be associated with a SATD between the sample value of the current block in the down-sampled current picture and the respective predicted sample value of the plurality of predicted sample values.

In an example, the SATD can be calculated based on a Hadamard Transform.

To generate the prediction of the current block, a first prediction of the current block can be generated based on the determined BCW mode. The first prediction of the current block can be equal to a weighed combination of a prediction from the first reference picture of the current picture and a prediction from the second reference picture of the current picture according to the determined BCW mode. A second prediction of the current block can be generated based on an equal weighting mode. The second prediction of the current block can be equal to an equally weighed combination of the prediction from the first reference picture of the current picture and the prediction from the second reference picture of the current picture according to the equal weighting mode. Which one of the first prediction and the second prediction is applied to predict the current block can be determined based on a comparison between (i) a first rate distortion value that is associated with a first difference between the current block and the first prediction of the current block, and (ii) a second rate distortion value that is associated with a second difference between the current block and the second prediction of the current block.

In some embodiments, the first rate distortion value and the second rate distortion value can be calculated in parallel.

In some embodiments, the first rate distortion value and the second rate distortion value can be calculated based on (i) a same cost function and/or (ii) one of a multithreaded program or a processor with multiple processing units.

After (S1140), the process proceeds to (S1199) and terminates.

The process (1100) can be suitably adapted. Step(s) in the process (1100) can be modified and/or omitted. Additional step(s) can be added. Any suitable order of implementation can be used. A decoder may be configured to perform a decoding process of reconstructing the encoded blocks. For example, the decoder can receive signal information that indicates one of a BCW mode or an equal weighting mode for the decoding process. The BCW mode can be determined in the encoding process (1100). The decoder can further reconstruct the encoded blocks based on the one of the BCW mode or the equal weighting mode that is indicated by the signal information.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
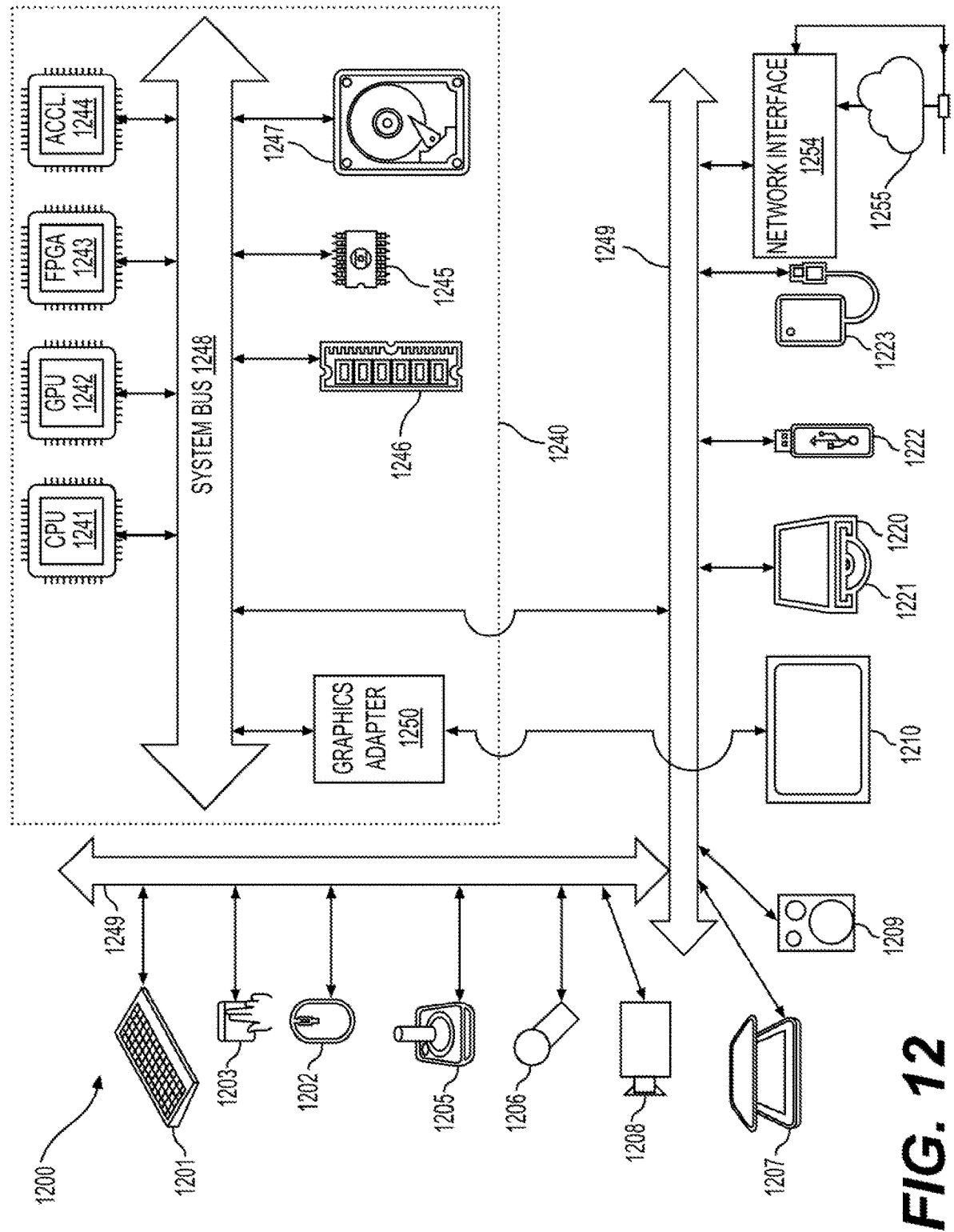
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding performed in a video encoder, the method comprising:
   determining whether a subregion of a current picture includes a fading region that transitions from a first scene to a second scene during a pre-analysis stage, the subregion of the current picture including one or more coding units (CUs);
   determining whether a bi-prediction with CU-level weight (BCW) mode is applied to the subregion of the current picture at a block level based on the subregion of the current picture including the fading region; and
   performing an inter prediction on the subregion of the current picture based on the subregion including the fading region and based on whether the BCW mode is determined to be applied to the subregion of the current picture at the block level.

2. The method of claim 1, wherein the subregion of the current picture is one of a coding tree unit of the current picture, a block with a predefined size, or a block with a size predefined by another detector that is different from a detector configured to detect the fading region.

3. The method of claim 2, wherein the subregion of the current block is the predefined size including 16 by 16 luma samples.

4. The method of claim 2, wherein:
   the BCW mode is applied to the subregion of the current picture based on the subregion including the fading region, and
   the performing further includes performing the inter bi-prediction on the subregion to generate a predicted sample value of the subregion of the current picture based on the BCW mode, the predicted sample value being equal to a weighted combination of a first predicted sample value from a first reference picture of the current picture and a second predicted sample value from a second reference picture of the current picture.

5. The method of claim 2, wherein:
   the BCW mode is not applied to the subregion of the current picture based on the subregion not including the fading region, and
   the performing further includes performing the inter bi-prediction on the subregion to generate a predicted sample value of the subregion of the current picture based on an equal weighting mode, the predicted sample value being equal to an equally weighted combination of a first predicted sample value from a first reference picture of the current picture and a second predicted sample value from a second reference picture of the current picture.

6. The method of claim 2, wherein:
   the BCW mode is applied to the subregion of the current picture based on the subregion including the fading region and an inter bi-prediction mode being applied to the subregion, and
   the performing further includes performing the inter bi-prediction on the subregion according to the inter bi-prediction mode to generate a predicted sample value of the subregion of the current picture based on the BCW mode, the predicted sample value being equal to a weighted combination of a first predicted sample value from a first reference picture of the current picture and a second predicted sample value from a second reference picture of the current picture.

7. A method of video encoding performed in a video encoder, the method comprising:
   determining a plurality of predicted sample values of a current block in a down-sampled current picture that is down sampled from a current picture during a pre-analysis stage based on a plurality of bi-prediction with coding unit level weight (BCW) modes, each of the plurality of predicted sample values being equal to a respective weighed combination of a first predicted sample value from a first down-sampled reference picture that is down sampled from a first reference picture of the current picture and a second predicted sample value from a second down-sampled reference picture that is down sampled from a second reference picture of the current picture according to a respective BCW mode of the plurality of BCW modes;
   determining a plurality of cost values associated with the plurality of BCW modes, each of the plurality of cost values being associated with a respective difference between a sample value of the current block in the down-sampled current picture and a respective predicted sample value of the plurality of predicted sample values;
   determining a BCW mode from the plurality of BCW modes that corresponds to a minimum cost value of the plurality of cost values; and
   generating a prediction of the current block based on the determined BCW mode.

8. The method of claim 7, wherein each of the plurality of cost values is associated with a sum of absolute difference (SAD) between the sample value of the current block in the down-sampled current picture and the respective predicted sample value of the plurality of predicted sample values.

9. The method of claim 7, wherein each of the plurality of cost values is associated with a sum of absolute transformed difference (SATD) between the sample value of the current block in the down-sampled current picture and the respective predicted sample value of the plurality of predicted sample values.

10. The method of claim 9, wherein the SATD is calculated based on a Hadamard Transform.

11. The method of claim 7, wherein the generating the prediction further comprises:
    determining a first prediction of the current block based on the determined BCW mode, the first prediction of the current block being equal to a weighed combination of a prediction from the first reference picture of the current picture and a prediction from the second reference picture of the current picture according to the determined BCW mode;
    determining a second prediction of the current block based on an equal weighting mode, the second prediction of the current block being equal to an equally weighed combination of the prediction from the first reference picture of the current picture and the prediction from the second reference picture of the current picture according to the equal weighting mode; and determining which one of the first prediction and the second prediction is applied to predict the current block based on a comparison between (i) a first rate distortion value that is associated with a first difference between the current block and the first prediction of the current block, and (ii) a second rate distortion value that is associated with a second difference between the current block and the second prediction of the current block.

12. The method of claim 11, wherein the first rate distortion value and the second rate distortion value are calculated in parallel.

13. The method of claim 11, wherein the first rate distortion value and the second rate distortion value are calculated based on (i) a same cost function and (ii) one of a multithreaded program or a processor with multiple processing units.

14. An apparatus, comprising:
processing circuitry configured to:
determine a plurality of predicted sample values of a current block in a down-sampled current picture that is down sampled from a current picture during a pre-analysis stage based on a plurality of bi-prediction with coding unit level weight (BCW) modes, each of the plurality of predicted sample values being equal to a respective weighed combination of a first predicted sample value from a first down-sampled reference picture that is down sampled from a first reference picture of the current picture and a second predicted sample value from a second down-sampled reference picture that is down sampled from a second reference picture of the current picture according to a respective BCW mode of the plurality of BCW modes;
determine a plurality of cost values associated with the plurality of BCW modes, each of the plurality of cost values being associated with a respective difference between a sample value of the current block in the down-sampled current picture and a respective predicted sample value of the plurality of predicted sample values;
determine a BCW mode from the plurality of BCW modes that corresponds to a minimum cost value of the plurality of cost values; and
generate a prediction of the current block based on the determined BCW mode.

15. The apparatus of claim 14, wherein each of the plurality of cost values is associated with a sum of absolute difference (SAD) between the sample value of the current block in the down-sampled current picture and the respective predicted sample value of the plurality of predicted sample values.

16. The apparatus of claim 14, wherein each of the plurality of cost values is associated with a sum of absolute transformed difference (SATD) between the sample value of the current block in the down-sampled current picture and the respective predicted sample value of the plurality of predicted sample values.

17. The apparatus of claim 16, wherein the SATD is calculated based on a Hadamard Transform.

18. The apparatus of claim 14, wherein the processing circuitry is configured to:
determine a first prediction of the current block based on the determined BCW mode, the first prediction of the current block being equal to a weighed combination of a prediction from the first reference picture of the current picture and a prediction from the second reference picture of the current picture according to the determined BCW mode;
determine a second prediction of the current block based on an equal weighting mode, the second prediction of the current block being equal to an equally weighed combination of the prediction from the first reference picture of the current picture and the prediction from the second reference picture of the current picture according to the equal weighting mode; and
determine which one of the first prediction and the second prediction is applied to predict the current block based on a comparison between (i) a first rate distortion value that is associated with a first difference between the current block and the first prediction of the current block, and (ii) a second rate distortion value that is associated with a second difference between the current block and the second prediction of the current block.

19. The apparatus of claim 18, wherein the first rate distortion value and the second rate distortion value are calculated in parallel.

20. The apparatus of claim 18, wherein the first rate distortion value and the second rate distortion value are calculated based on (i) a same cost function and (ii) one of a multithreaded program or a processor with multiple processing units.

* * * * *